United States Patent [19]

Decuir

[11] Patent Number: 6,044,818
[45] Date of Patent: Apr. 4, 2000

[54] VIBRATION DAMPENER FOR INTERNAL COMBUSTION ENGINES

[75] Inventor: Julian A. Decuir, Pinon Hills, Calif.

[73] Assignee: Almarv LLC

[21] Appl. No.: 09/140,398

[22] Filed: Aug. 26, 1998

[51] Int. Cl.$^7$ .................................................. F02B 75/06
[52] U.S. Cl. ................................... 123/192.1; 123/197.4; 384/430
[58] Field of Search .............................. 123/192.1, 197.4; 384/430, 216, 153

[56] References Cited

U.S. PATENT DOCUMENTS

| | | | |
|---|---|---|---|
| 538,722 | 5/1895 | Biedermann | 384/216 |
| 1,367,478 | 2/1921 | Hapgood. | |
| 2,064,086 | 12/1936 | Short et al. | 384/216 |
| 3,188,152 | 6/1965 | Miller | 384/153 |
| 3,390,925 | 7/1968 | Fangman | 384/430 |
| 4,114,961 | 9/1978 | Pithie | 384/430 |
| 4,461,585 | 7/1984 | Mahrus et al. | 384/288 |
| 4,617,884 | 10/1986 | Allen. | |
| 4,926,810 | 5/1990 | Diehl et al.. | |
| 5,517,957 | 5/1996 | Wagner et al.. | |

*Primary Examiner*—Willis R. Wolfe
*Assistant Examiner*—Jason Benton
*Attorney, Agent, or Firm*—Liniak, Berenato Lonagacre & White

[57] ABSTRACT

A vibration absorbing member is disposed within an annular recess on the side of the connecting rod/bearing cap assembly or alternatively/additionally disposed between the crankshaft main bearing and crank shaft main bearing journal. A vibration absorbing member is preferably comprised of two pieces to fit in a recessed portion of the connecting rod and a recessed portion of the bearing cap to facilitate easy installation. The vibration absorbing member absorbs vibrations between the connecting rod/bearing cap assembly and the crank shaft. Similarly, the vibration absorbing member absorbs vibration between the crank shaft and the engine block when disposed between the crankshaft and the crankshaft main bearing. In conventional single or multiple in-line cylinder engines the vibration absorbing member is disposed on both sides of the connecting rod and bearing cap assembly. In V-type engines with two adjacent connecting rods, one of the connecting rods has a single vibration absorbing member disposed on the side contacting the crankshaft. The other connecting rod has a vibration absorbing member disposed on both sides of the connecting rod and bearing cap assembly. Thus, vibrations are isolated between the two adjacent connecting rods as well as between the connecting rods and the crank shaft. The vibration absorbing material is preferably made of an oil resistant elastomeric rubber material.

11 Claims, 7 Drawing Sheets

VIBRATION DAMPENER FOR INTERNAL COMBUSTION ENGINES

BACKGROUND OF THE INVENTION

1. Field of the Invention

This invention relates to the absorption/isolation of vibrations in internal combustion engines, and is more particularly directed to absorbing/isolating harmonic vibrations between a connecting rod/bearing cap assembly or crank shaft main bearing assembly and the crankshaft of an internal combustion engine.

2. Brief Description of the Prior Art

U.S. Pat. No. 5,517,957 discloses a device for damping torsional vibrations in a drive train connected to an internal combustion engine and is incorporated herein by reference. However, the '957 reference to Wagner et al. is complicated and expensive to manufacture, is bulky and is located further away from the source of the vibrations. U.S. Pat. No. 4,617,884 also discloses a torsional vibration isolator and is incorporated herein by reference. The '884 reference to Allen et al. discloses a resilient coupling 12 to isolate the flywheel from the crank shaft. Here again, vibrations isolation is attempted far away from the source of the vibrations, requires a custom crankshaft/flywheel configuration and is expensive to manufacture.

The isolators of the prior art suffer from the drawback that they can not be simply incorporated into conventional internal combustion engine designs, are costly, heavy, bulky and are located far from the source of the vibrations. The instant invention is believed to alleviate all of the drawbacks of the prior art isolators with a simple inexpensive design.

SUMMARY OF THE INVENTION

A vibration absorbing member is disposed within an annular recess on the side of the connecting rod/bearing cap assembly or alternatively/additionally disposed between the crankshaft main bearing and crank shaft main bearing journal. A vibration absorbing member is preferably comprised of two pieces to fit in a recessed portion of the connecting rod and a recessed portion of the bearing cap to facilitate easy installation. The vibration absorbing member absorbs vibrations between the connecting rod/bearing cap assembly and the crank shaft. Similarly, the vibration absorbing member absorbs vibration between the crank shaft and the engine block when disposed between the crankshaft and the crankshaft main bearing. In conventional single or multiple in-line cylinder engines the vibration absorbing member is disposed on both sides of the connecting rod and bearing cap assembly. In V-type engines with two adjacent connecting rods, one of the connecting rods has a single vibration absorbing member disposed on the side contacting the crankshaft. The other connecting rod has a vibration absorbing member disposed on both sides of the connecting rod and bearing cap assembly. Thus, vibrations are isolated between the two adjacent connecting rods as well as between the connecting rods and the crank shaft. The vibration absorbing material is preferably made of an oil resistant elastomeric rubber material.

DETAILED DESCRIPTION OF THE PREFERRED EMBODIMENT

To effectively reduce and eliminate the transmission of harmonic and other vibrations from the connecting rod to the crankshaft, a vibration dampener member 6a,6b is disposed between the connecting rod and crankshaft.

Conventionally, the connecting rod which houses the rod bearings is separated from the crankshaft journal by a thin layer of lubricating oil. Similarly, the sides of the connecting rod are bathed in lubricating oil preventing contact with the crankshaft. Because of the relative incompressibility of this oil layer, vibrations are easily transmitted from the connecting rod/bearing assembly to the crankshaft. The arrangement of the present invention has demonstrated significant reduction in the transmission of vibrations emanating from the combustion chamber, which in turn are transmitted to the connecting rod via the piston. Thus vibrations are prevented/reduced from being transmitted to the crankshaft and consequently to the remaining portions of the drive train assembly.

Figures 1, 2, 3:
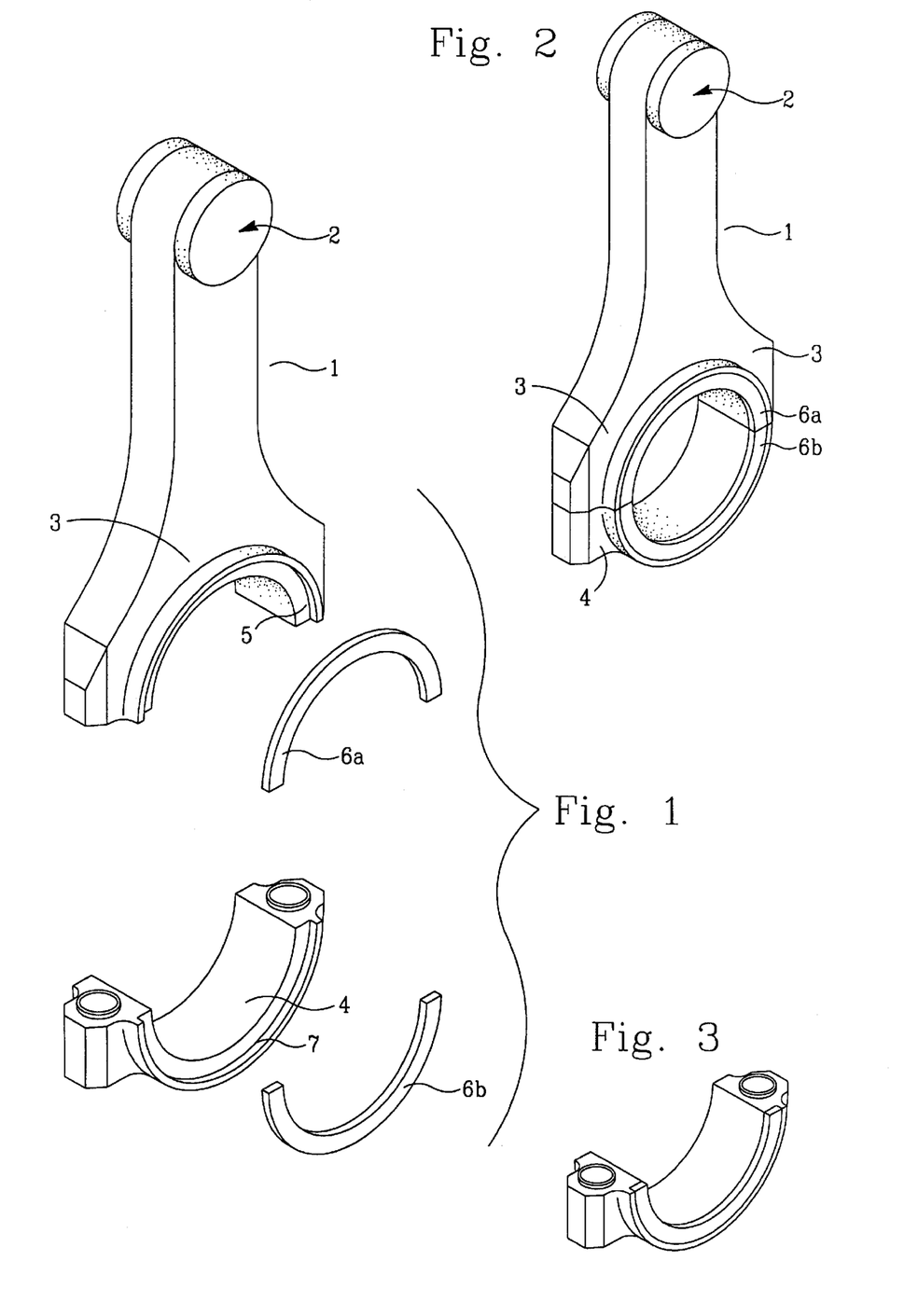
FIG. 1 represents an exploded perspective view of a connecting rod incorporating the dampener of the present invention.
FIG. 2 is a perspective view of the assembled device of FIG. 1 according to the present invention.
FIG. 3 is an isolated perspective view of the bearing cap incorporating the dampener of the present invention.
Figures 4, 5:
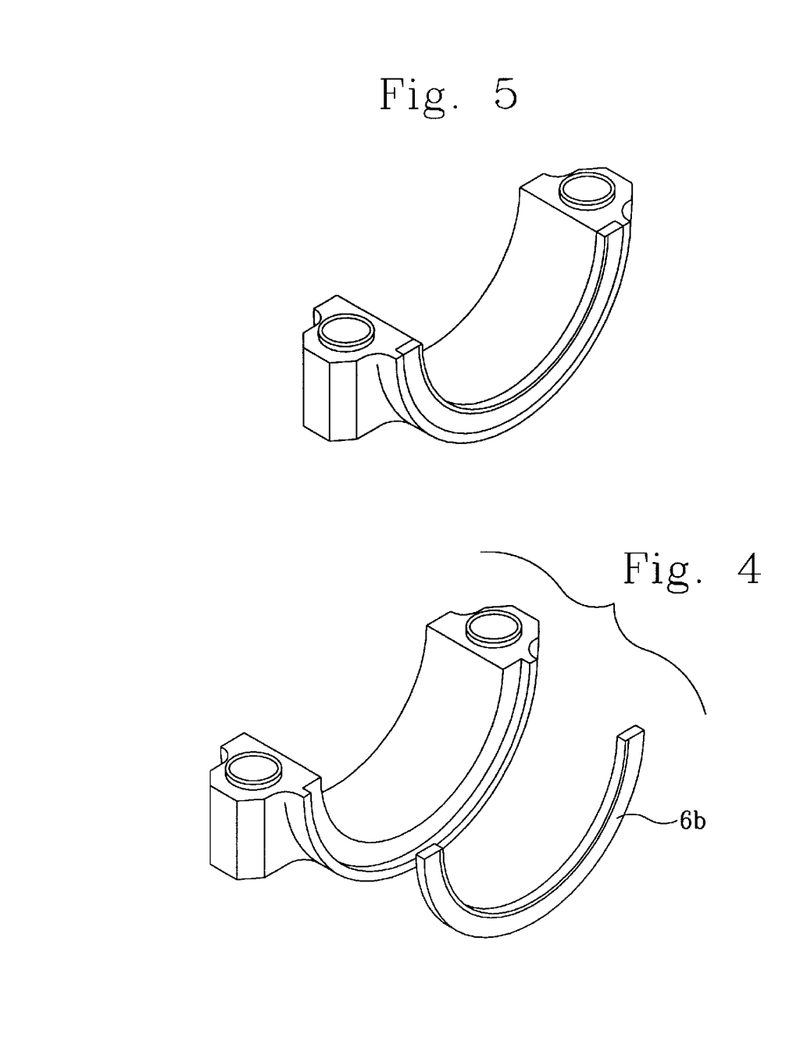
FIG. 4 is another exploded perspective view of a bearing cap incorporating the dampener according to the present invention.
FIG. 5 is a perspective assembled view of the bearing cap of FIG. 4.
Figure 6:
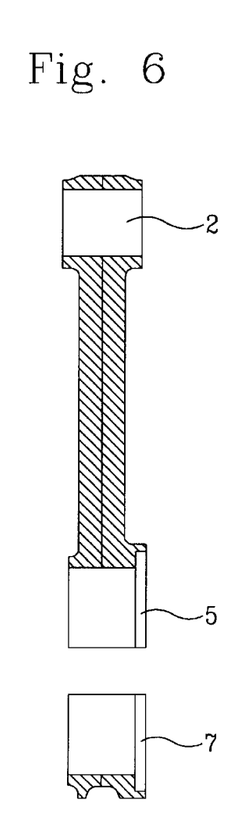
FIG. 6 is a cross sectional exploded view taken along line 6—6 of FIG. 7.
Figure 7:
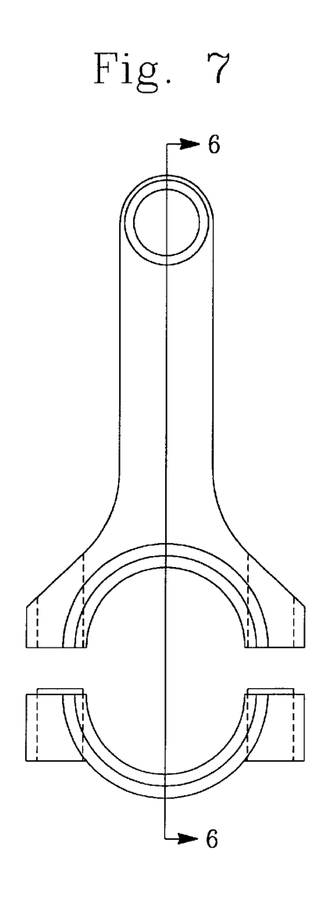
FIG. 7 is an exploded side view of a connecting rod having a recessed portion adapted to receive the dampener according to the present invention.
Figure 8:
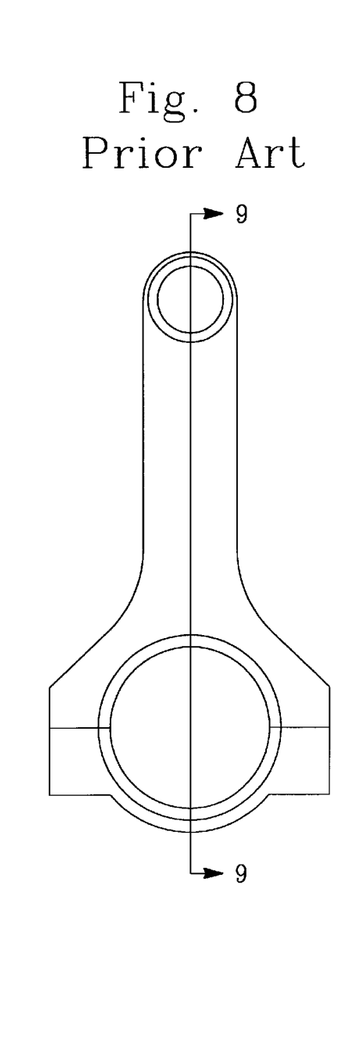
FIG. 8 is a side view of an assembled conventional connecting rod and bearing cap assembly of the prior art.
Figure 9:
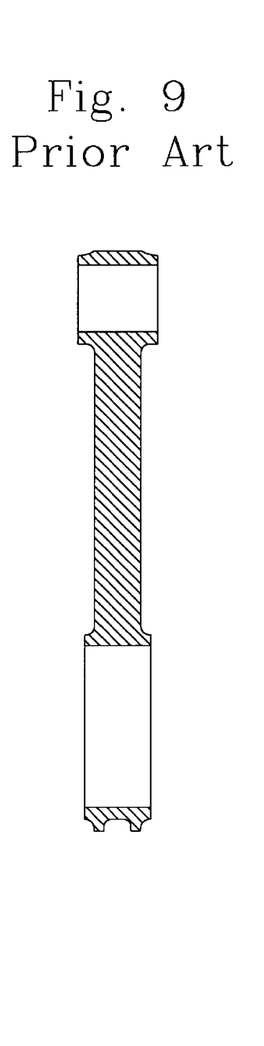
FIG. 9 is a cross sectional view taken long line 9—9 of FIG. 8.
Figure 10:
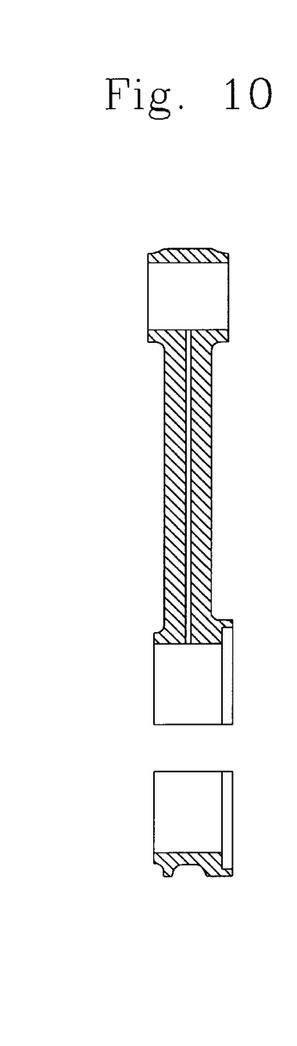
FIG. 10 is an exploded cross sectional view taken along line 10—10 of FIG. 11.

FIG. 1 represents an exploded view of the vibration dampener according to one embodiment of the invention. In this embodiment a connecting rod 1 has a first end 2 for connection to a piston pin in a conventional manner. The connecting rod 1 extends to a second end 3 which connects with a bearing cap 4. The second end 3 of the connecting rod 1 and the bearing cap 4 are secured together in a conventional manner to circumscribe a journal of a crank shaft.

The connecting rod has a semi-annular recessed portion 5 adapted to receive a semi-annular vibration dampener member 6a. Similarly, the bearing cap 4 has a semi-annular recessed portion 7 adapted to receive a second semi-annular vibration dampener 6b. The two vibration dampeners 6a, 6b together form an o-ring like pad. This vibration dampener is preferably made of a slippery elastomeric oil resistant rubber material. However, other vibration absorbent material may be used such as oil resistant elastomeric plastic or other synthetic materials.

Figure 11:
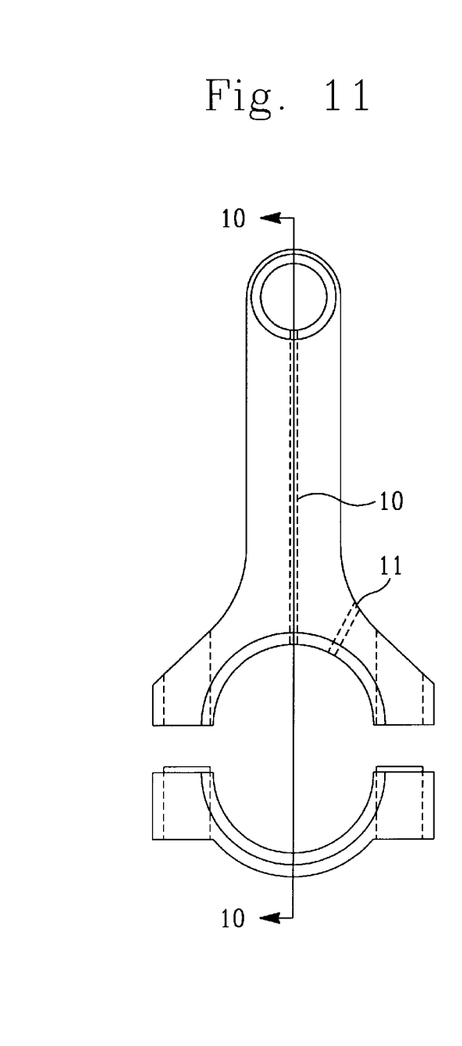
FIG. 11 is an exploded side view of an alternated connecting rod and bearing cap incorporating the dampener of the present invention.
Figure 12:
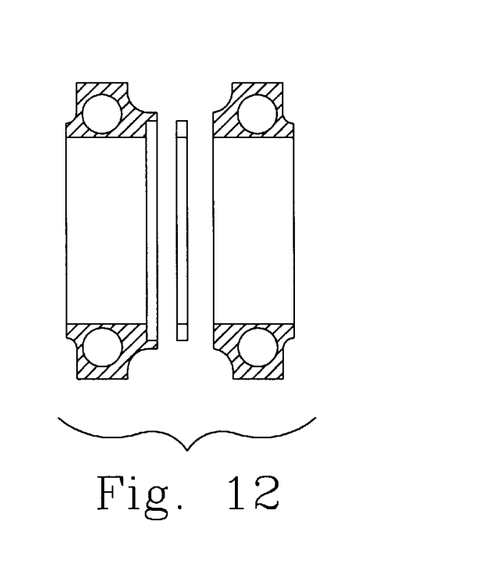
FIG. 12 is an exploded bottom view of two adjacent connecting rods incorporating the dampener of the present invention taken along line 12—12 of FIG. 14.
Figure 13:
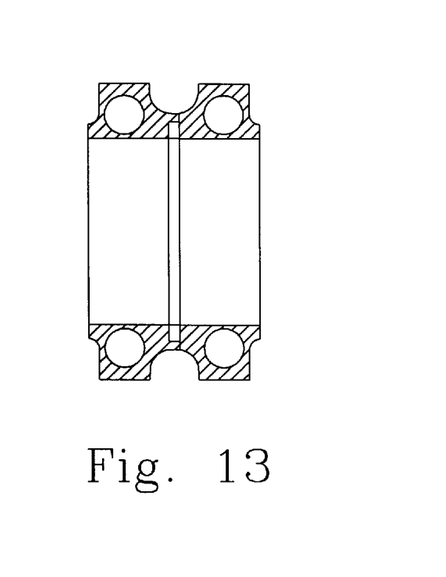
FIG. 13 is a bottom view of two adjacent connecting rods incorporating the dampener of the present invention taken along line 13—13 of FIG. 15.
Figure 14:
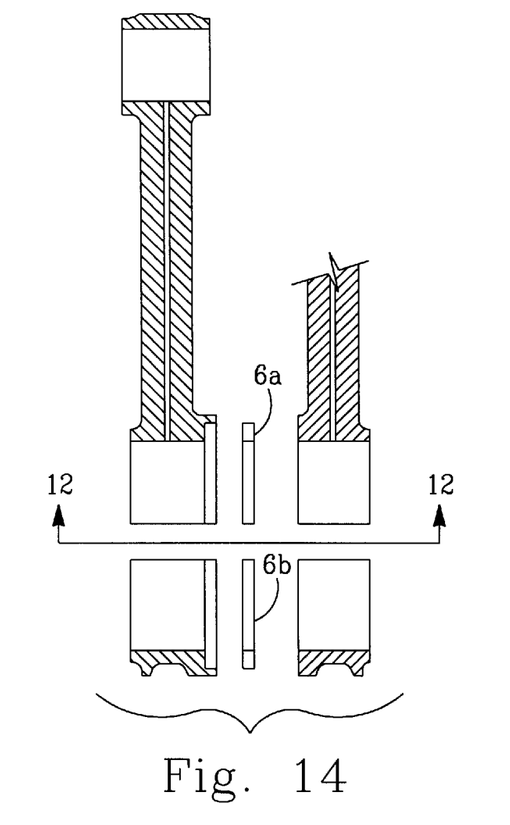
FIG. 14 is a cross sectional exploded view of two adjacent connecting rods and bearing caps incorporating the dampener of the present invention.
Figure 15:
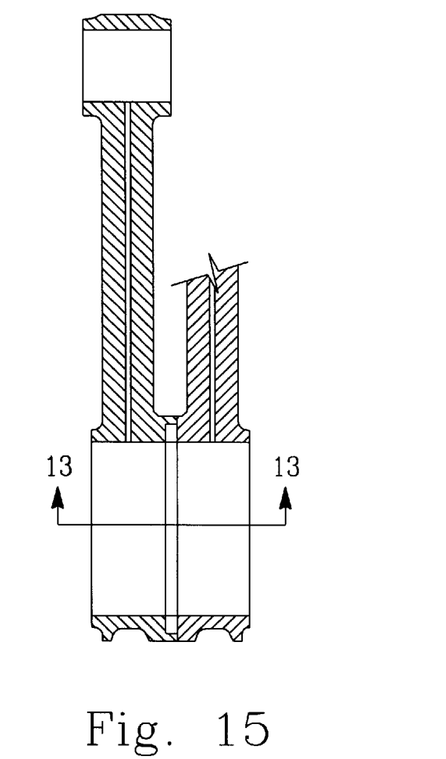
FIG. 15 is a cross sectional view of two adjacent connecting rods and bearing caps incorporating the dampener of the present invention.
Figure 16:
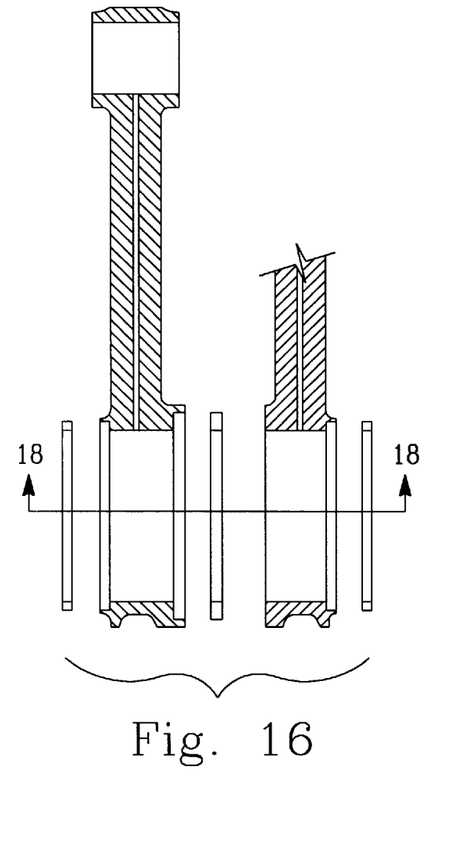
FIG. 16 is an exploded cross sectional view of two adjacent connecting rods of an alternate embodiment incorporating the dampener of the present invention.
Figure 17:
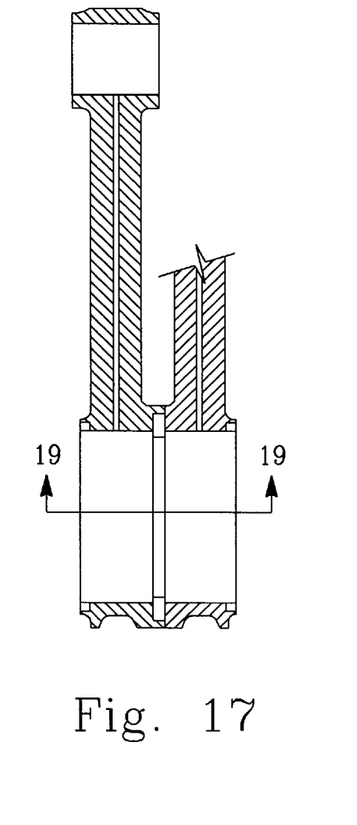
FIG. 17 is a cross sectional view of the two adjacent connecting rods of FIG. 16 assembled.
Figure 18:
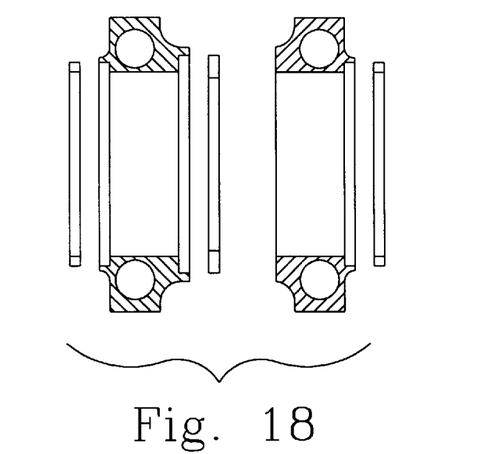
FIG. 18 is an exploded bottom view of the two connecting rods of FIG. 16 taken along line 18—18.
Figure 19:
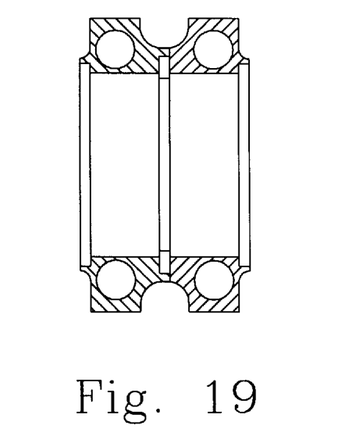
FIG. 19 is a bottom view of the two connecting rods of FIG. 17 taken along line 19—19.

FIG. 11 represents a similar connecting rod and bearing cap assembly comprising oil passages 10 and 11 to facilitate lubrication between the connecting rod and piston and the crankshaft. Such an arrangement provides the necessary lubrication for the embodiments having a dampener disposed on both sides of the connecting rod.

When the dampener of the instant invention is embodied in multiple cylinder in-line internal combustion engines, each connecting rod/bearing cap assembly will comprise a vibration dampener. Preferably each connecting rod will have two such vibration dampeners disposed on either side of the connecting rod.

The vibration dampener of the instant invention may also be employed in V-type internal combustion engines. FIGS. 12–15 represent an alternative embodiment of the claimed invention. In this embodiment, two connecting rod and bearing cap assemblies are disposed juxtaposed to one another for connection to a single journal of a crankshaft in a V-type internal combustion engine. In this embodiment, one of the two connecting rod and bearing cap assemblies has vibration dampener members 6a, 6b disposed between the two assemblies to dampen transmission of vibrations therebetween.

Figure 20:
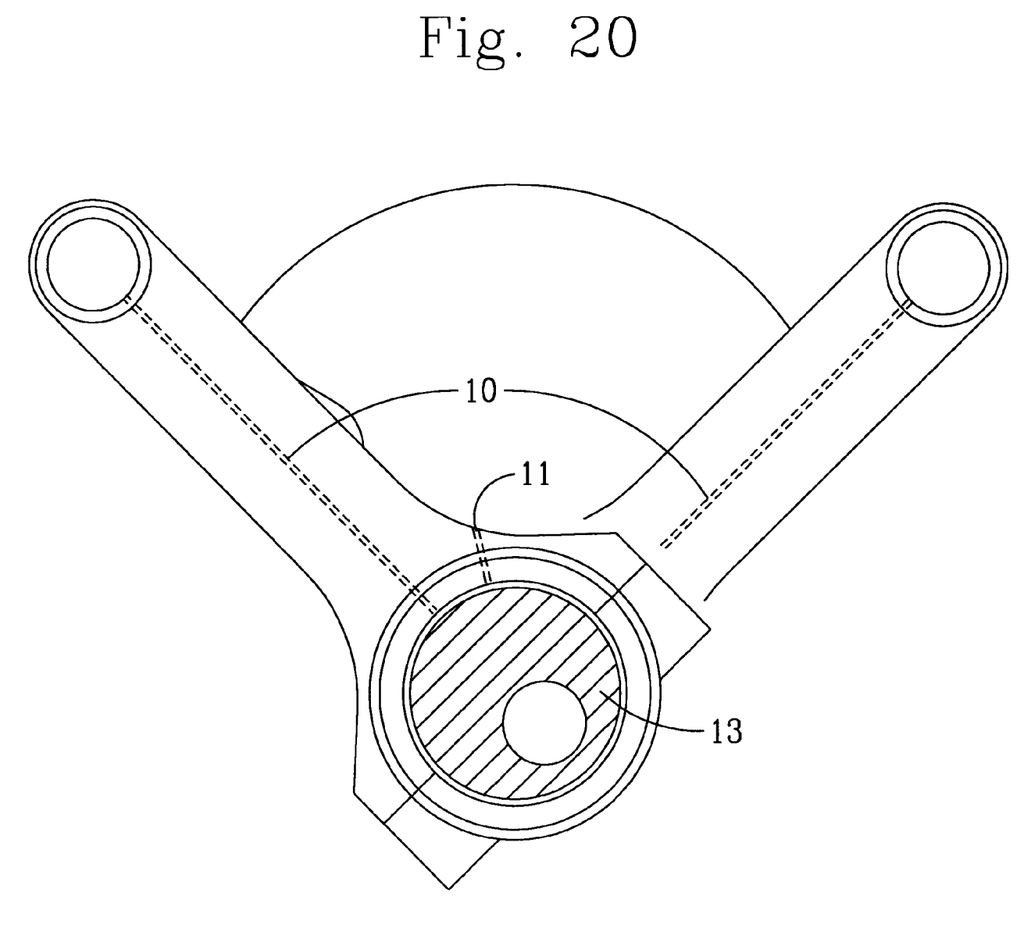
FIG. 20 is a side view of two adjacent connecting rods connected to a crank shaft of a V-type internal combustion engine.
Figure 21:
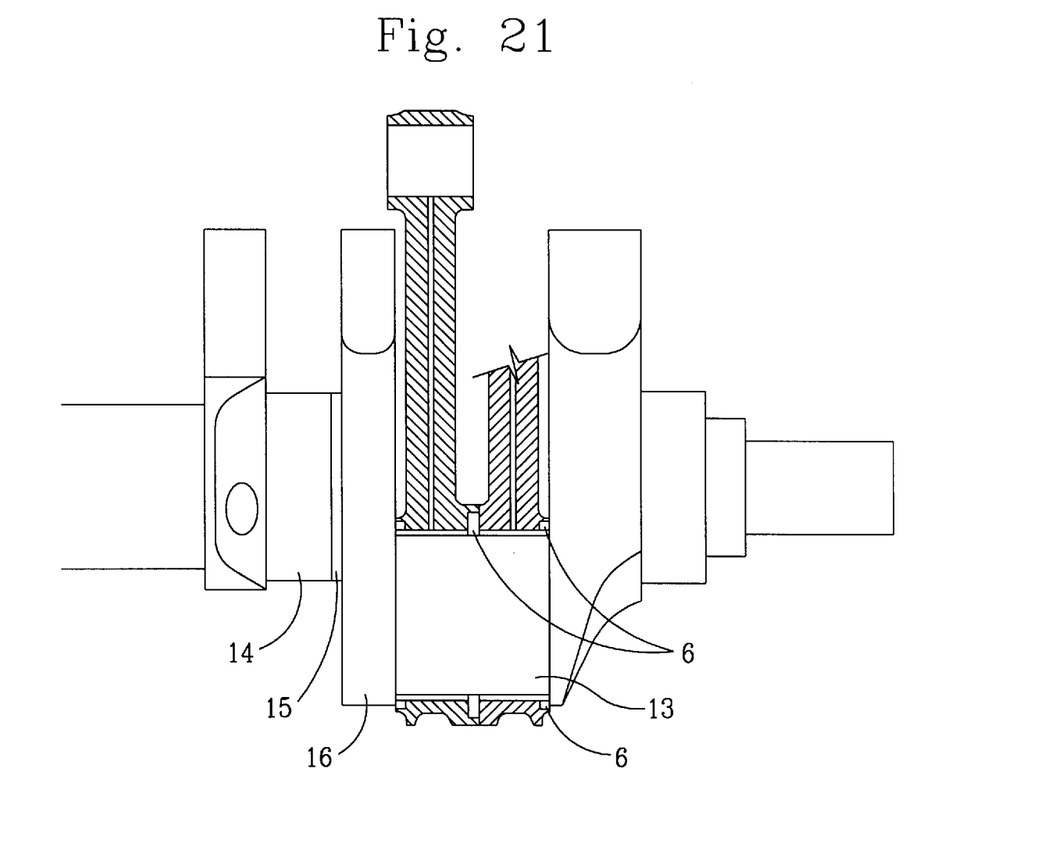
FIG. 21. is a cross sectional view of two adjacent connecting rods connected to a crankshaft of a v-type internal combustion engine and a main bearing journal each incorporating dampener according to the present invention.
Figure 22:
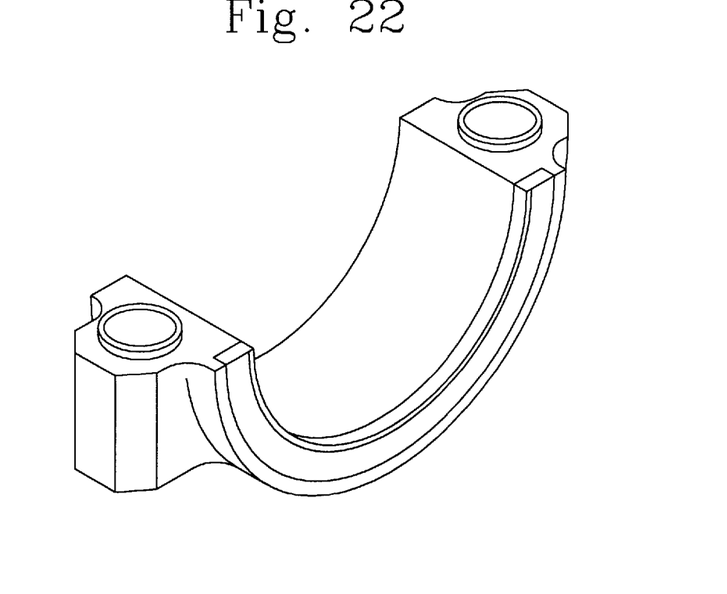
FIG. 22 is an enlarged view of a connecting rod bearing cap incorporating-the vibration dampener of the present invention.

FIGS. 16–19 represent a preferred V-type engine vibration dampener arrangement. In this embodiment, one of two juxtaposed connecting rod assemblies has a vibration dampener disposed on opposite sides. The second of the two juxtaposed connecting rods has just one vibration dampener disposed on the longitudinally outwardly facing side of the connecting rod with respect to an attached crankshaft journal. FIGS. 20 and 21 each depict two such juxtaposed connecting rod/bearing cap assemblies connected to a crankshaft journal 13 of a V-type internal combustion engine. The three vibration dampeners effectively reduce and nearly eliminate the transmission of vibrations from the connecting rods to the crankshaft. Here again, oil distributions passages 10, 11 may be employed to facilitate lubrication.

FIG. 21 also discloses an additional vibration dampener 15 disposed about the crank shaft main bearing journal 14.

In this embodiment, the vibration dampener 15 is disposed within the main bearings similarly to the way the vibration dampeners 6a, 6b are disposed within the connecting rod and bearing cap assembly. Preferably, the vibration dampener 15 is disposed both radially between the main bearings and the crank shaft's main bearing journal and between the main bearings and the counter weight lobe 16. This embodiment reduces/eliminates vibrations transmitting through the crank shaft to the engine block and vice versa.

While the main bearings are not shown, it is understood that one of ordinary skill in the art can incorporate the dampener of the present invention between the main bearing and crank shaft main bearing journal in a similar fashion to the incorporation of a vibration dampener in the connecting rod as described above. Heretofore, no such vibration dampeners have be incorporated between the main bearings and crank shaft main bearing journal.

Combining a vibration damper 16 between the crank shaft and main bearing and between the connecting rod and crank shaft has demonstrated a substantial reduction in harmonic and other vibrations transmitting through the entire engine and power train assembly.

While the foregoing invention has been shown and described with reference to a preferred embodiment, it will be understood by those possessing skill in the art that various changes and modifications may be made without departing from the spirit and scope of the invention.

I claim:

1. A connecting rod for an internal combustion engine, said connecting rod comprising;

a main rod portion extending from a first end adapted to be connected to a piston pin to a second end;

a bearing cap connected to said second end of said main rod portion, wherein said bearing cap and said second end of said main rod portion together are adapted to be connected to a rod journal of a crankshaft; said bearing cap and said second end of said main rod portion each having a recessed portion together circumscribing said rod journal of said crankshaft when attached thereto; and a vibration damper member disposed in said recessed portions of said bearing cap and said second end of said main rod portion thereby substantially damping a transmission of vibrations from said connecting rod to said crankshaft.

2. The connecting rod according to claim 1, wherein said vibration damper member comprises an O-ring made of an oil resistant elastomeric rubber material.

3. The connecting rod according to claim 2, wherein said O-ring is comprised of first and second semi-annular members, said first member disposed within said recess of said second end of said main rod portion of said connecting rod and said second semi-annular member disposed within said recess of said bearing cap, said first and second semi-annular members together substantially circumscribing said rod journal of said crankshaft.

4. The connecting rod according to claim 1, wherein said vibration damper member is disposed adjacent a longitudinally outwardly facing side of said connecting rod.

5. A combination crankshaft and at least one connecting rod assembly, said crankshaft being adapted to rotate about a longitudinal axis and having at least one rod journal longitudinally offset from said longitudinal axis; said connecting rod being rotatably connected to said at least one rod journal; said combination comprising:

at least one vibration dampener disposed between said connecting rod and said crankshaft to substantially dampen a transmission of vibrations therethrough.

6. The combination according to claim 5, wherein said at least one vibration dampener comprises at least two vibration dampeners disposed on opposite longitudinally outwardly facing sides of said connecting rod.

7. The combination according to claim 5, wherein said combination comprises two juxtaposed connecting rods rotatably connected to said at least one rod journal, said at least one vibration dampener comprises at least three dampeners, a first one of said vibration dampeners being disposed between said two juxtaposed connecting rods and a second and a third vibration dampener respectively disposed one each on longitudinally outwardly facing sides of said two juxtaposed connecting rods.

8. The combination according to claim 5, wherein said crankshaft further includes a counterweight lobe adjacent said at least one rod journal, wherein said at least one vibration dampener is longitudinally disposed between said counterweight lobe and said connecting rod.

9. A vibration dampener for an internal combustion engine, said internal combustion engine comprising:
   a crankshaft having at least one rod journal; and
   a connecting rod rotatably connected to said at least one rod journal of said crankshaft;
   said vibration dampener comprising an elastomeric member disposed between said crankshaft and said connecting rod thereby dampening a transmission of vibrations between said connecting rod and said crankshaft.

10. The vibration dampener according to claim 9, wherein said crankshaft of said internal combustion engine further comprises a counterweight lobe adjacent said at least one rod journal, and said vibration dampener is longitudinally disposed between said connecting rod and said counterweight lobe.

11. A combination crankshaft and at least one main bearing assembly, said crank shaft having at least one main bearing journal; said at least one main bearing disposed about said main bearing journal of said crank shaft and thereby rotatably supporting said crank shaft to an internal combustion engine block, said combination comprising:
   at least one vibration dampener disposed between said main bearing journal of said crank shaft and said at least one main bearing to substantially dampen a transmission of vibrations therethrough.

\* \* \* \* \*